Patented Aug. 30, 1932

1,874,474

UNITED STATES PATENT OFFICE

HEINZ EICHWEDE AND JOSEPH RACHOR, OF FRANKFORT-ON-THE-MAIN-HOCHST, GERMANY, ASSIGNORS TO GENERAL ANILINE WORKS, INC., OF NEW YORK, N. Y., A COPORATION OF DELAWARE

YELLOW AZO DYESTUFF

No Drawing. Application filed August 27, 1928, Serial No. 302,436, and in Germany September 19, 1927.

This invention relates to new yellow azo dyestuffs, more particularly to azo dyestuffs of the following general formula:

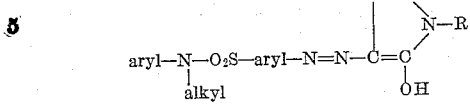

wherein X stands for —CH₃, —COOH or —COO-alkyl and R represents a phenyl nucleus which may be substituted by alkyl, oxalkyl, the sulfonic acid or the carboxylic acid group.

We have found that dyestuffs of excellent fastness properties are obtainable by coupling the diazo compound of a base of the general formula:

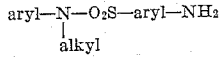

wherein the two aryl residues may be substituted or not, with a pyrazolone of the general formula:

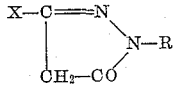

wherein X stands for CH₃, COOH or COO-alkyl and R represents a phenyl nucleus which may be substituted by alkyl, O-alkyl, the sulfonic acid or the carboxylic acid group.

When using as coupling components non-sulfonated pyrazolones the dyestuffs may subsequently be sulfonated. The new dyestuffs possess very good properties as to fastness to washing, fulling and light and can be used according to their composition as wool dyestuffs, for silk and artificial silk or as lake dyestuffs.

The following example illustrates the invention, it being understood that it is in no way limitative. The parts are by weight:

26.2 parts of meta-aminobenzenesulfonic acid methylphenylamide are diazotized with 48 parts of hydrochloric acid of 20° Bé. and 6.9 parts of sodium nitrite, and the diazo compound is coupled with 27.6 parts of the sodium salt of 1-(4'-sulfophenyl)-3-methyl-5-pyrazolone in the presence of an excess of sodium carbonate. The resulting dyestuff is precipitated by the addition of sodium chloride and filtered. It dyes wool yellow tints of excellent fastness to washing, fulling and light. It has the following formula:

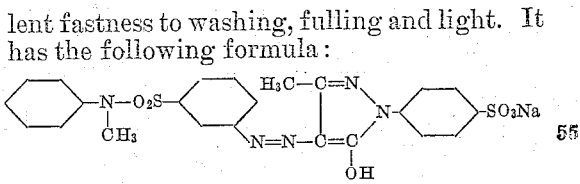

The meta-aminobenzenesulfonic acid methylphenylamide of the formula:

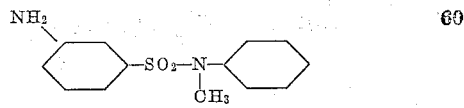

used as starting material may, for instance, be prepared by methylating and reducing the condensation product from meta-nitrobenzenesulfonic acid chloride and aniline or by reducing the condensation product from meta-nitrobenzenesulfo chloride and methylaniline.

Similar dyestuffs are obtained by substituting for the meta-aminobenzenesulfo-acid-methylphenylamide for instance meta-aminobenzenesulfonic-acid - ethylphenylamide, or para-aminotoluene - ortho - sulfonic-acid-methylphenylamide, or para-aminotoluene-ortho-sulfonic-acid-methyl-ortho-tolylamide or the like, or by substituting for the 1-(4'-sulfophenyl) - 3 - methyl-5-pyrazolone another non-halogenated pyrazolone, pyrazolonesulfonic acid, carboxylic acid or sulfocarboxylic acid or an ester of these compounds.

We claim:

1. As new products, the azo dyestuffs of the following general formula:

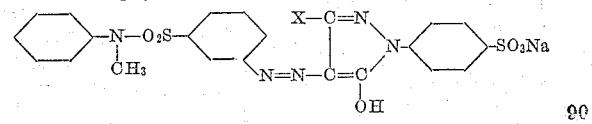

wherein X stands for —CH₃, —COOH or —COO-alkyl, being yellow powders dyeing the material yellow shades of good fastness properties.

2. As a new product, the azo dyestuff of the following general formula:

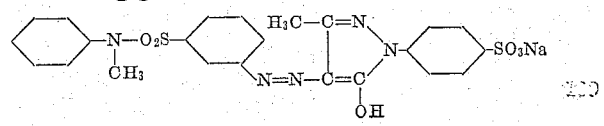

being a yellow powder dyeing wool yellow tints of excellent fastness to washing, fulling and light.

3. As new products the azo dyestuffs of the following general formula:

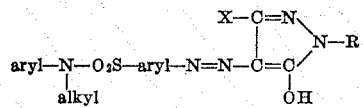

wherein X stands for —CH₃, —COOH or —COO-alkyl and wherein R represents a phenyl nucleus which may be substituted by alkyl, O-alkyl, the sulfonic acid or the carboxylic acid group and wherein aryl represents a benzene residue, the said new products being yellow powders yielding dyeings of yellow shades and of good fastness properties.

4. As new products the azo dyestuffs of the following general formula:

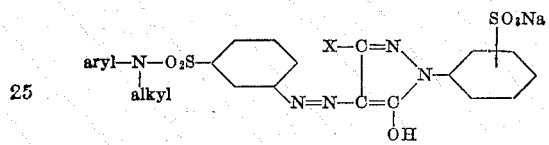

wherein X stands for —CH₃, —COOH or —COO-alkyl and wherein aryl represents a benzene residue the said products being yellow powders yielding dyeings of yellow shades and of good fastness properties.

5. As new products the azo dyestuffs of the following general formula:

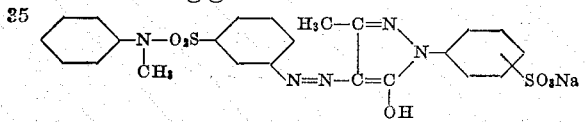

being yellow powders yielding dyeings of yellow shades and of good fastness properties.

6. As new products, the azo dyestuffs of the following general formula:

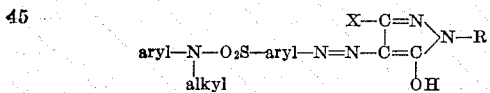

wherein X stands for —CH₃ or —COOH and wherein R represents a phenyl nucleus which is substituted by the sulfonic acid group and wherein aryl represents a benzene residue.

7. As new products, the azo dyestuffs of the following formula:

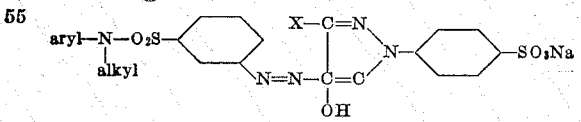

wherein X stands for —CH₃ or —COOH and wherein aryl represents a benzene residue.

In testimony whereof, we affix our signatures.

HEINZ EICHWEDE.
JOSEPH RACHOR.